United States Patent
Follen et al.

(10) Patent No.: US 10,302,025 B2
(45) Date of Patent: May 28, 2019

(54) SYSTEMS AND METHODS FOR CYLINDER DEACTIVATION WITH DEACTIVATED CYLINDER PRESSURE CONTROL

(71) Applicant: Cummins Inc., Columbus, IN (US)

(72) Inventors: Kenneth M. Follen, Greenwood, IN (US); Suk-Min Moon, Greenwood, IN (US); Vivek A. Sujan, Columbus, IN (US); James Randall Nebergall, Columbus, IN (US)

(73) Assignee: Cummins Inc., Columbus, IN (US)

( * ) Notice: Subject to any disclaimer, the term of this patent is extended or adjusted under 35 U.S.C. 154(b) by 200 days.

(21) Appl. No.: 15/407,403

(22) Filed: Jan. 17, 2017

(65) Prior Publication Data

US 2017/0204799 A1    Jul. 20, 2017

Related U.S. Application Data

(60) Provisional application No. 62/278,616, filed on Jan. 14, 2016.

(51) Int. Cl.
| | |
|---|---|
| *F02D 41/40* | (2006.01) |
| *F02D 13/06* | (2006.01) |
| *F02D 41/00* | (2006.01) |

(52) U.S. Cl.
CPC ............ *F02D 13/06* (2013.01); *F02D 41/008* (2013.01); *F02D 41/0087* (2013.01); *F02D 41/40* (2013.01); *F02D 41/0002* (2013.01); *F02D 2041/0012* (2013.01); *Y02T 10/18* (2013.01); *Y02T 10/44* (2013.01)

(58) Field of Classification Search
CPC ...... F02D 13/06; F02D 41/0087; F02D 41/40; F02D 2041/0012; Y02T 10/44
USPC ................. 123/198 DB, 198 F, 481; 701/104
See application file for complete search history.

(56) References Cited

U.S. PATENT DOCUMENTS

| | | | |
|---|---|---|---|
| 5,228,422 A * | 7/1993 | Wakeman | F01L 1/26 123/308 |
| 5,813,383 A | 9/1998 | Cummings | |
| 7,331,332 B2 | 2/2008 | Baumann et al. | |
| 7,581,531 B2 * | 9/2009 | Schulz | F02D 41/0087 123/198 DB |
| 7,805,927 B2 | 10/2010 | Brown et al. | |
| 8,612,118 B2 * | 12/2013 | Elsaßer | F01N 13/107 123/198 F |
| 8,886,422 B2 | 11/2014 | Sujan et al. | |
| 2011/0265771 A1 | 11/2011 | Banker | |
| 2012/0323465 A1 * | 12/2012 | Peters | F02D 41/0082 701/104 |

(Continued)

*Primary Examiner* — Erick R Solis
(74) *Attorney, Agent, or Firm* — Taft Stettinius & Hollister LLP (57) ABSTRACT

Systems, apparatus, and methods are disclosed that include an internal combustion engine having a plurality of cylinders operable by a valve actuation mechanism that opens and closes the intake and exhaust valves during nominal engine operations. In response to engine operations indicating a cylinder deactivation condition, one or more the cylinders is selected for deactivation and operated by combusting an amount of fuel that is effective to limit air flow through the deactivated cylinder(s) so that the air flow and combusted fuel amount are less than during nominal cylinder operations.

18 Claims, 5 Drawing Sheets

(56) References Cited

U.S. PATENT DOCUMENTS

2014/0014066 A1\* 1/2014 Yacoub ................. F02D 17/02
123/406.23
2015/0252738 A1\* 9/2015 Sixel ................. F02D 19/0607
123/445

\* cited by examiner

SYSTEMS AND METHODS FOR CYLINDER DEACTIVATION WITH DEACTIVATED CYLINDER PRESSURE CONTROL

CROSS-REFERENCE TO RELATED APPLICATION

The present application claims the benefit of the filing date of U.S. Provisional Application No. 62/278,616 filed on Jan. 14, 2016.

FIELD OF INVENTION

This invention relates to an internal combustion engine with multiple cylinders, and more particularly to cylinder deactivation of one or more of the multiple cylinders through pressure control of the deactivated cylinder.

BACKGROUND

The cylinders in an internal combustion engine can be disabled in order to reduce fuel consumption. This may be accomplished by cutting off the supply of fuel to selected cylinders, particularly to save fuel under light engine load conditions. This increases the load on the other cylinders and provides some pumping loss reduction, but still requires pumping work to move the air flow through all the cylinders.

Another method of cylinder disablement includes disabling or maintaining the intake and exhaust valves of the cylinder in a closed condition in addition to providing fuel cutoff to the deactivated cylinders. This method further reduces pumping work over simply providing a fuel cutoff to the deactivated cylinders, further increasing fuel efficiency. However, in order to cut off air flow to the deactivated cylinders, appropriate valve actuation hardware is required to keep the intake and/or exhaust valves closed during the deactivation mode of operation. The required hardware can be costly and results in additional hardware and software controls. As a result, cylinder deactivation systems may not be cost effective, or at least its cost effectiveness is reduced, due to these requirements. Therefore, further improvements in cylinder deactivation systems and controls are desired.

SUMMARY

One embodiment is a unique system that includes a multi-cylinder internal combustion engine configured to control deactivation of at least one cylinder of the multiple cylinders through internal pressure control in the combustion chamber of the at least one deactivated cylinder. In one embodiment, the cylinder deactivation is conducted to provide an effective fuel and air cutoff condition to the deactivated cylinder(s) without any additional hardware being added to the engine for deactivation of the cylinder(s).

In some embodiments, the engine includes an exhaust system with an exhaust emission after-treatment device for treatment of exhaust gases from the cylinders, an air supply system for supplying a charge flow to the cylinders, and a fuel supply system for supplying fuel to each cylinder. A controller is configured to combust a small amount of fuel in the deactivated cylinders at an appropriate intake valve and exhaust valve opening timing, such as when both are simultaneously open, such that the pressure resulting from the fuel combustion limits the air flow through the deactivated cylinder(s) in response to a deactivation condition. As a result, the cylinder(s) are effectively deactivated without any new hardware, but rather by providing a pressure balance resulting from an injection of an effective amount of fuel and combustion of the effective amount of fuel at an appropriate timing to limit air flow through the deactivated cylinder(s). The effective fuel amount is significantly less amount of fuel than would be combusted in a non-deactivated cylinder under low load conditions, thus providing increased fuel efficiency.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1A:
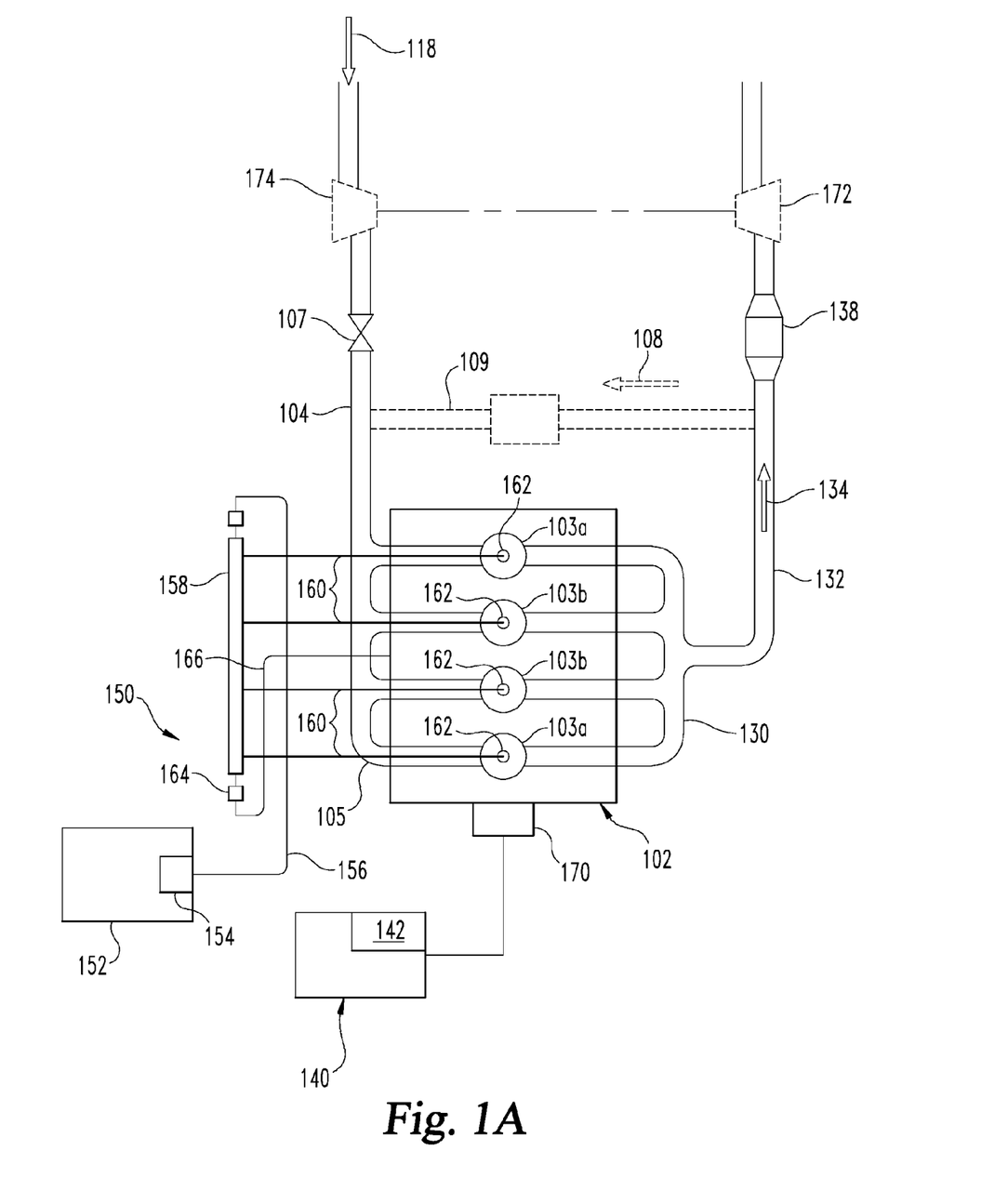
FIG. 1A is a schematic depiction of a system having an internal combustion engine.

Referencing FIG. 1A, a system 100 is depicted having an engine 102. The engine 102 is an internal combustion engine of any type, and can include a stoichiometric engine, a diesel engine, a gasoline engine, an ethanol engine, and/or a natural gas engine. In certain embodiments, the engine 102 includes a lean combustion engine such as a lean burn gasoline engine, or a diesel cycle engine. In certain embodiments, the engine 102 may be any engine type producing emissions that may include an exhaust gas recirculation (EGR) system, for example to reduce $NO_x$ emissions from the engine 102. The engine 102 includes a number of cylinders 103a, 103b (collectively referred to as cylinders 103.) The number of cylinders 103 may be any number suitable for an engine.

Figure 1B:
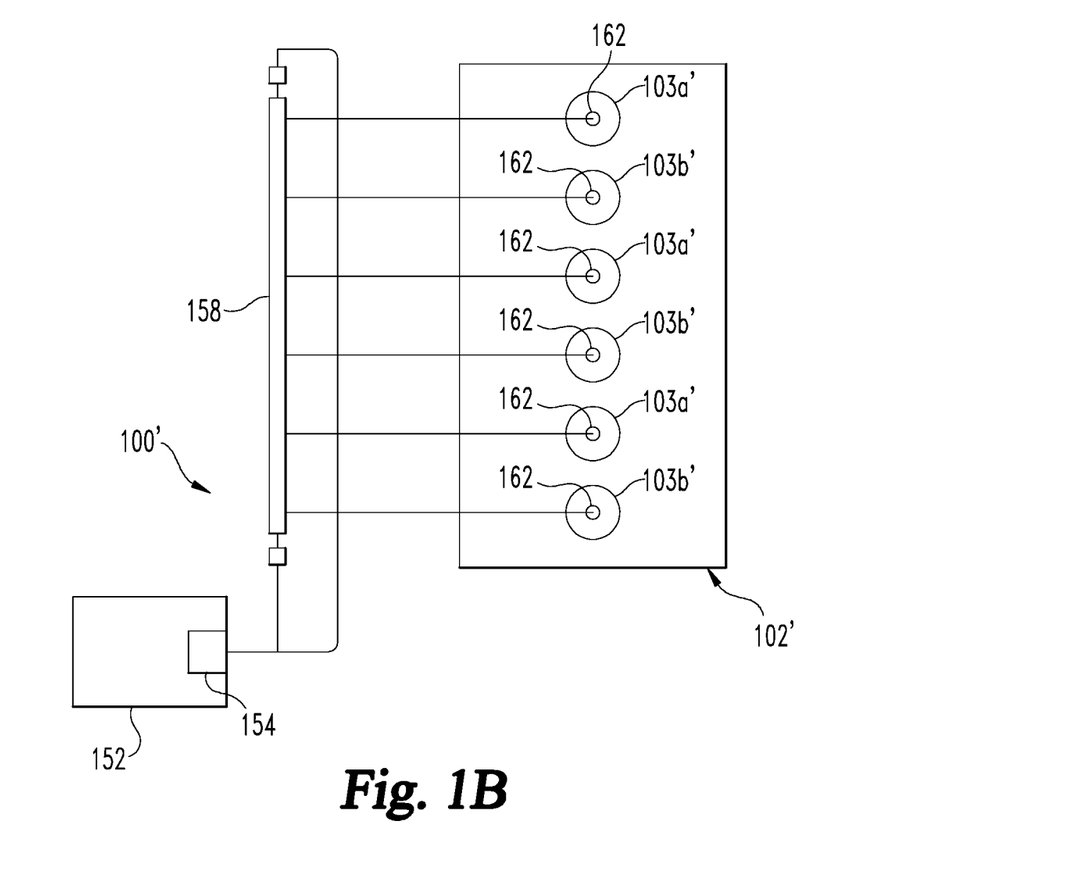
FIG. 1B is a schematic depiction of the system of FIG. 1A with another embodiment internal combustion engine.

In the illustrated embodiment of FIG. 1A, the system 100 includes an engine 102 having an inline 4 cylinder arrangement for illustration purposes, but V-shaped arrangements and other cylinder numbers are also contemplated. For example, the embodiment in FIG. 1B includes a system 100' with another embodiment engine 102' that includes an inline 6 cylinder arrangement. The discussion herein with respect to engine 102 also applies to engine 102' and system 100' unless specifically noted otherwise. In FIG. 1B, the intake, exhaust and controller systems are omitted for brevity and clarity.

The engine 102 includes nominal cylinders 103a which are operated with a nominal valve lift profile and nominal fuelling amount under nominal cylinder operating conditions, and with an increased fuelling amount and air flow under cylinder deactivation operating conditions to satisfy torque demand with fewer cylinders. Engine 102 also includes one or more deactivation cylinders 103b which are operated with the nominal valve lift profile and nominal fuelling amount when deactivation conditions are not present, and with a deactivation fuelling amount that is combusted at a valve opening timing that reduces an air flow through the deactivated cylinder(s) 103b in response to cylinder deactivation conditions being present. One or more of the deactivation cylinders 103b can be operated with the nominal valve lift profile when cylinder deactivation conditions are present while the deactivation fuelling amount is provided and combusted. In the illustrated embodiment of FIG. 1A, two cylinders 103 of engine 102 are deactivation cylinders 103b, but more or fewer than two cylinders can be deactivation cylinders. In the illustrated embodiment of FIG. 1B, three cylinders of engine 102' are deactivation cylinders 103b' and three cylinders 103a' are nominal cylinders, but more or fewer than three cylinders can be deactivation cylinders. In addition, the cylinders identified as nominal and deactivation cylinders in FIGS. 1A and 1B can be any number of cylinders and in any order if fewer than all cylinders are deactivation cylinders.

Figure 2:
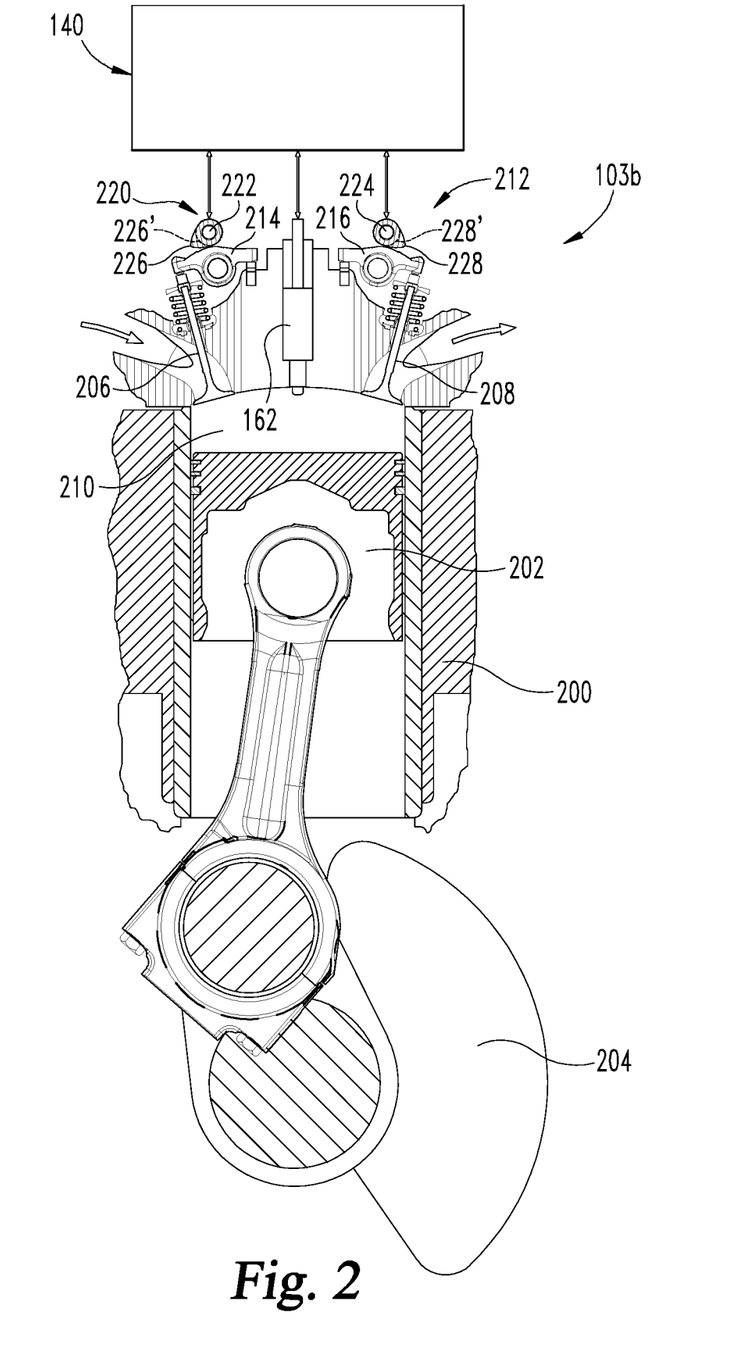
FIG. 2 is a cross-section of one embodiment of a cylinder of the internal combustion engine and a valve actuation mechanism.

Referring to FIG. 2, a typical multi-cylinder engine 102 has an engine block 200 with multiple cylinders 103, and a piston 202 in a combustion chamber 210 formed in each cylinder, and piston 202 is operably attached to a crankshaft 204. There is also at least one intake valve 206 and at least one exhaust valve 208 that allow passage of air into and out of each cylinder 103. The typical engine 102 operates on a four-stroke cycle that sequentially includes an air intake stroke, a compression stroke, a power stroke, and an exhaust stroke. As used herein, one cycle of the cylinder or engine occurs at the completion of these four strokes.

When cylinders are deactivated, the opening mechanism of prior art valve actuation mechanisms is collapsed so the intake and exhaust valves of the deactivated cylinders remain in a completely closed condition during cylinder deactivation. In addition, fuel delivery to the deactivated cylinders is stopped. The active cylinders are then operated with a greater amount of air and fuel (greater than nominal fuel and air amounts during non-deactivation conditions) to meet the engine power demands. The active cylinders thus operate with a greater air flow, reducing pumping losses, and providing improved fuel efficiency during cylinder deactivation. However, the increased efficiency requires additional hardware and controls to collapse the valve actuation mechanisms for the deactivated cylinders.

The present system 100 includes a valve actuation mechanism 220 that is configured to provide a non-zero lift profile for opening and closing intake valve 206 of each cylinder 103 in response to nominal engine operation conditions. The exhaust valve(s) 208 of each cylinder can also be opened and closed with a non-zero valve lift profile that is the same or different from that of the non-zero-valve lift profile that opens and closes the intake valves 206. As shown in FIG. 2, valve actuation mechanism 220 is further configured to continue to open and close the intake and exhaust valves 206, 208 with their respective non-zero valve lift profiles in response to cylinder deactivation conditions. A cylinder deactivation condition can be determined in response to one or more engine operating conditions, such as a low engine load and/or low engine speed. A cylinder deactivation condition can also or alternatively be determined based on one or more look ahead conditions, such as route grade, platooning conditions, weather conditions, route parameters, etc.

Valve actuation mechanism 220 includes hardware mounted in a head 212 of engine 102 and control algorithms that are internal to the controller 140. The cylinder deactivation hardware includes a valve opening mechanism 214, 216 for respective ones of intake and exhaust valves 206, 208 of each cylinder 103. The valve actuation mechanism 220 also comprises a hydraulic subsystem (not shown) that supplies pressurized oil from an engine oil pump (not shown) to each valve opening mechanism 214, 216. In one embodiment, the valve opening mechanism 214, 216 is comprised of a lifter and a locking pin mechanism that is inserted between the camshaft 222, 224 and the respective valves 206, 208.

A typical valve train is comprised of the camshafts 222, 224, or in another embodiment a single cam shaft. The plurality of valves 206, 208 are normally closed to a zero lift position against their respective valve seats and are spring-mounted in the head 212. The valve train is operable to open the plurality of exhaust valves 208, the plurality of intake valves 206, or both, depending upon the engine design. Each camshaft 222, 224 is a long rod that is mounted in the engine 102 and rotates around its longitudinal axis. Each camshaft 222, 224 has cam lobes 226, 228, respectively, that correspond to and operate each valve 206, 208. Cam lobes 226, 228 are typically cut into the respective camshaft 222, 224 such that they are eccentric to the axis of rotation of the respective camshaft 222, 224 and project outwardly from the respective base circle 226', 228'.

Each cam lobe 226, 228 has an eccentric portion and a portion that is concentric to the longitudinal axis of the cam shaft 222, 224, the concentric portion being formed by base circle 226' 228', respectively. The eccentric portion projects from the base circle to define a non-zero-lift profile to open and close the respective valve 206, 208 for a specified lift and duration from its valve seat. Each lobe 226, 228 is in physical contact with a respective one of the valve opening mechanisms 214, 216, which are each comprised of a lifter and a locking pin mechanism. The valve opening mechanisms 214, 216 are in physical contact with a respective one of the valves 206, 208. The rotation of the camshaft 222, 224 causes respective valve 206, 208 to open according to the non-zero lift profile defined by the corresponding lobe 226, 228 when the position of the respective camshaft 222, 224 is such that the eccentric portion of its corresponding lobe 226, 228 is in contact with the adjacent valve opening mechanism 214, 216.

For deactivation cylinders 103b, the valve actuation mechanism 220 is operable to continue to open and close the intake valve 206 and the exhaust valve 208 in response to a deactivation condition. In addition, the nominal fuelling from each fuel injector 162 to deactivated cylinders 103b is disabled or suspended during the deactivation condition, and a deactivation fuelling amount is provided from fuel injector 162 to the deactivated cylinder(s) 103b in an amount and timing that reduces air flow through the deactivated cylinder(s) 103b, effectively providing a fuel and air flow cutoff with the deactivated cylinder(s) 103b that is substantially reduced from nominal air flow and fuelling amounts during non-deactivation conditions.

Referring back to FIG. 1A, in the system 100 exhaust flow 134 produced by cylinders 103 is provided to an exhaust manifold 130 and outlet to an exhaust passage 132. System 100 may include and exhaust gas recirculation (EGR) passage 109 to provide an EGR flow 108 that combines with an intake flow 118 at a position upstream of an intake manifold 105. Intake manifold 105 provides a charge flow including the intake flow 118 and, if provided, with EGR flow 108 to cylinders 103. Intake manifold 105 is connected to an intake passage 104 that includes an intake throttle 107 to regulate the charge flow to cylinders 103. Intake passage 104 may also include a charge air cooler (not shown) to cool the charge flow provided to intake manifold 105. Intake passage 104 may also include an optional compressor 174 to compress the intake air flow received from an intake air cleaner (not shown.)

The EGR flow 108 may combine with the intake flow 118 at an outlet of EGR passage 109, at a mixer, or by any other arrangement. In certain embodiments, the EGR flow 108 returns to the intake manifold 105 directly. In the illustrated embodiment, EGR flow 108 mixes with the intake flow 118 downstream of throttle 107 so that exhaust pressure on cylinders 103 is closely aligned with intake pressure, which reduces pumping losses through cylinders 103. In other embodiments, EGR passage 109 can include an EGR cooler (not shown) and a bypass (not shown) with a valve that selectively allows EGR flow to bypass the EGR cooler. The presence of an EGR cooler and/or an EGR cooler bypass is optional and non-limiting.

Cylinders 103 are connected to an exhaust system that includes an exhaust manifold 130 that receives exhaust gases in the form of exhaust flow 134 from cylinders 103 and an exhaust passage 132 that receives exhaust gas from exhaust manifold 130. In other embodiments, a turbine 172 in exhaust passage 132 is provided that is operable via the exhaust gases to drive a compressor 174 in intake passage 104. Exhaust passage 132 includes an aftertreatment system 138 in exhaust passage 132 that is configured to treat emissions in the exhaust gas. In one embodiment, aftertreatment system 138 includes a catalyst, such as a selective catalytic reduction catalyst or a three-way catalyst. Other embodiments contemplate an exhaust throttle (not shown) in the exhaust passage 132.

System 100 further includes a fuel system 150 that is operable to provide fuel from a fuel storage source 152, such as a fuel tank, to cylinders 103. The fuel storage source 152 includes, for example, an onboard fuel pump 154 which delivers fuel from the source 152 via a conduit 156 through a filter (not shown) to a common supply rail 158. The common rail 158 feeds fuel via respective fuel lines 160 to a plurality of fuel injectors 162, at least one per cylinder, and in this example, four injectors 162. The common rail 158 can also be connected via conduit 156 to a pressure regulator valve 164 which in turn is connected to conduit 166 to vent fuel vapor to the intake passage 104 when the pressure in the rail 158 exceeds a predetermined maximum pressure. The fuel pump 154 is operated through a relay or other suitable connection to controller 140.

A direct injector, as utilized herein, includes any fuel injection device that injects fuel directly into the cylinder volume, and is capable of delivering fuel into the cylinder volume when the intake valve(s) and exhaust valve(s) are closed. The direct injector 162 may be structured to inject fuel at the top of the cylinder. In certain embodiments, the direct injector 162 may be structured to inject fuel into a combustion pre-chamber. Each cylinder 103 may include one or more direct injectors 162. The direct injectors 162 may be the primary or the only fueling device for the cylinders 103, or alternatively the direct injectors may be an auxiliary or secondary fueling device for the cylinders 103. In certain embodiments, the direct injectors 162 are capable of providing the entire designed fueling amount for the cylinders 103 at any operating condition. Alternatively, the direct injectors 162 may be only partially capable, for example the direct injectors 162 may be capable of providing a designated amount of fuel for a specific purpose.

In still other embodiments, cylinders 103 include a port injector (not shown) in addition to or alternatively to direct injectors 162. In these embodiments, the intake manifold 105 may be divided, or the port fuel injectors may be positioned such that no other cylinder 103 in the system 100 is downstream of the port fuel injector, i.e. only the target cylinder is downstream of the respective port fuel injector.

The fuel supply to the combustion chamber of each cylinder 103 is controlled by a fuel control module 142 that is a separate controller or a part of controller 140. Fuel control module 142 operates the injectors 162 according to a fuel command produced by controller 140 in response to engine operating conditions. The controller 140 is connected to the fuel pump 154 and to a plurality of other engine condition sensors shown schematically as sensor 170. The engine condition sensors 170 may include, but are not limited to, sensors which monitor engine position, engine speed, manifold static pressure, mass air flow into the manifold, engine temperature, air temperature, cam shaft position (inlet and exhaust), inlet manifold tuning valves, barometric pressure, EGR amount, VGT position, torque demand, gear position, etc.

In certain embodiments, the system 100 includes a controller 140 structured to perform certain operations to control operations of engine 102. In certain embodiments, the controller 140 forms a portion of a processing subsystem including one or more computing devices having memory, processing, and communication hardware. The controller 140 may be a single device or a distributed device, and the functions of the controller 140 may be performed by hardware or software. The controller 140 may be included within, partially included within, or completely separated from an engine controller (not shown). The controller 140 is in communication with any sensor or actuator throughout the system 100, including through direct communication, communication over a datalink, and/or through communication with other controllers or portions of the processing subsystem that provide sensor and/or actuator information to the controller 140.

In certain embodiments, the controller 140 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Figure 3:
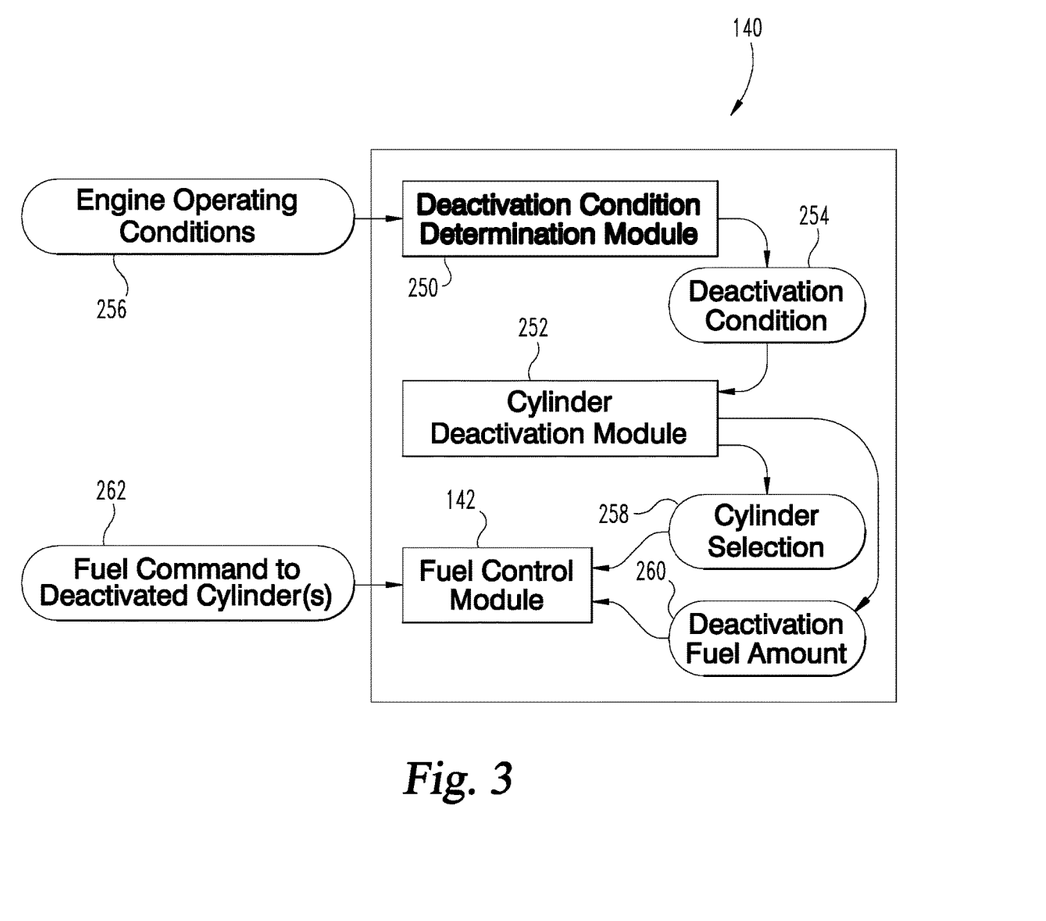
FIG. 3 is a schematic of a controller apparatus for deactivating one or more cylinder of an internal combustion engine.

Certain systems are described following, and include examples of controller operations in various contexts of the present disclosure. In certain embodiments, such as shown in FIG. 3, controller 140 includes a deactivation condition determination module 250, a cylinder deactivation module 252, and fuel control module 142. The deactivation condition determination module 250 of controller 140 interprets a cylinder deactivation condition 254 in response to one or more engine operating conditions 256. In response to the cylinder deactivation condition 254 being present, the cylinder deactivation module 252 determines a cylinder selection 258 for which and how many of the cylinder(s) 103 are to be deactivated, and a deactivation fuel amount 260 to be provided for the deactivated cylinder(s) 103b. Fuel control module 142 determines a fuel command 262 for the deactivated cylinder(s) in response to the deactivation fuel amount 260 that provides fuel to the one or more of deactivation cylinders 103b for combustion at an appropriate valve opening/closing time and in an amount that reduces air flow through the deactivated cylinder(s) 103b to simulate air flow conditions that would occur if the intake and/or exhaust valves of the deactivated cylinder(s) were closed during the deactivation condition. The determination that a cylinder deactivation condition 254 is present includes determining or interpreting one or more engine operating conditions understood in the art indicating that cylinder deactivation produces favorable operating conditions, such as at low engine load conditions where the remaining non-deactivated cylinders 103a can satisfy the engine load requirements and fuel efficiency can be achieved by substantially reducing fuelling to one or more of the deactivation cylinders 103b from the nominal fuelling amount.

The fuel injectors 162 may inject the fuel supply directly into each respective cylinder 103 or may supply fuel to the inlet valve ports, the injection timing being controlled the controller 140. During cylinder deactivation, the amount of fuel supplied to the deactivation cylinder(s) 103b is substantially reduced via control of the respective fuel injectors 162 while nominal valve openings and closing profiles are maintained. The quantity and timing of the fuelling amount provided in response to a fuelling command with controller 140 enables combustion of the deactivation fuelling amount 140 to limit air flow through the deactivated cylinder(s) 103b while the nominal cylinders 103a are fuelled and operated normally, or are compensated with additional fuel and air flow to meet power demands of engine 102 during deactivation conditions.

The operation of the engine 102 is controlled by the controller 140 in response to vehicle operating conditions 256 sensed by the sensors represented by sensor(s) 170. Controller 140 is connected to the fuel injectors 162, either indirectly as shown through fuel control module 142, or directly, to control the injector operation to provide the deactivation condition fuelling amount at the designated valve opening/closing timing. The fuel control module 142 can determine the injection timing and/or the injection period or pulse width that provides the deactivation fuelling amount 260. Under normal or nominal engine operating conditions, fuel is provided to all cylinders 103. Under a cylinder deactivation condition, fuel is provided to cylinders 103a in an amount to satisfy the torque demand of engine 102, and the fuelling amount is reduced from the nominal amount for the deactivated cylinder(s) 103b to combust a smaller fuel amount that provides a pressure balance in the combustion chamber of the deactivated cylinder(s) 103b. The deactivation fuel amount 260 is designed to reduce or prevent air flow through the deactivated cylinder(s) 103b to effectively provide fuel and air flow cutoff conditions in the deactivated cylinder(s) 103b even though the intake and exhaust valves 206, 208 of the deactivated cylinder(s) 103b are continued to be opened and closed during the deactivation condition.

A boosted internal combustion engine will see a fuel economy benefit if both fuel and air are cutoff from a given cylinder under "lower" load conditions. This is based on the assessment of brake efficiency through the balance of GIMEP (gross indicated mean effective pressure), FMEP (friction mean effective pressure), and PMEP (pumping mean effective pressure.) Fundamentally, with fuel cutoff only, the engine brake efficiency sees a decrease in net GIMEP, an increase in FMEP and an increase in PMEP. When both fuel and air flow are cutoff in a portion of the cylinders, the engine brake efficiency may see an increase in net GIMEP, a decrease in PMEP and minimal change to FMEP.

For fuel cutoff fuel only, appropriate fuel system commands are provided by a controller to the fuelling system to disable fuelling. In addition, prior art cylinder deactivation techniques provided air flow cutoff to a cylinder via appropriate valve actuation hardware to keep the intake and/or exhaust valves disabled in the deactivated cylinders. This additional hardware can be costly and required additional controls (hardware and software). As such it is difficult to implement hardware-based cylinder deactivation and justify the benefits at least in certain implementations.

The systems, methods and controller apparatus disclosed herein require no additional hardware to effectively provide both fuel and air flow cutoff to one or more deactivated cylinder(s) 103b. The fuelling system 150 is controlled to combust a small amount of fuel in the deactivated cylinder(s) 103b such that the pressure developed internally (within the deactivated cylinder(s) 103b) limits the flow of air through the intake and exhaust valves 206, 208. As a result, the active cylinders 103a operate with a greater air flow, reducing pumping losses and providing improved fuel efficiency.

In one embodiment, the combustion recipe in the deactivated cylinder(s) 103b is determined so that the air flow that occurs in a deactivated cylinder 103b with intake and exhaust valves 206, 208 remaining closed is effectively replicated or at least reduced relative to nominal air flow conditions in a cylinder deactivation mode of operation. For example, in FIG. 4 a procedure 300 includes an operation 302 to operate the engine under nominal conditions in which all cylinders 103 are fuelled with a nominal fuel amount according to any suitable fuelling strategy that satisfies torque demand and any other requirements. Procedure 300 continues at operation 304 in which a cylinder deactivation condition is determined. The interpretation that a cylinder deactivation condition is or will occur can also include an identification of which and/or how many of the cylinders 103 to be deactivated.

Figure 4:
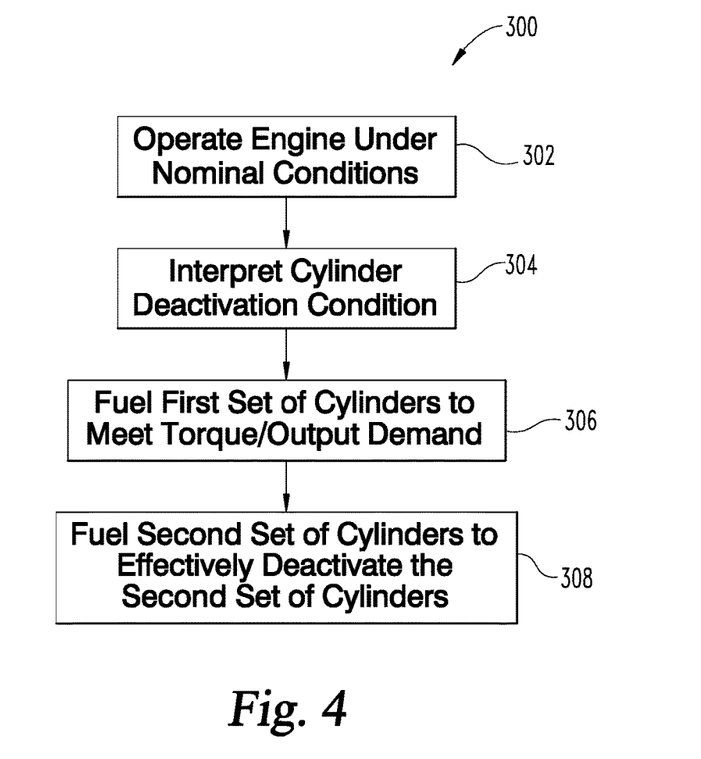
FIG. 4 is a flow diagram of a procedure for deactivating one or more cylinders of an internal combustion engine.

In response to a deactivation condition being present, procedure 300 continues at operation 306 to fuel a first set of cylinders such as cylinders 103a to meet the torque demand or output requirements for the engine. Procedure 300 further continues at operation 308 to fuel a second set of cylinders, such as deactivated cylinders 103b, with a deactivation condition fuelling amount. The deactivation condition fuelling amount is provided at a timing such that the fuel in the deactivated cylinder(s) 103b is combusted so the active cylinder 103a just prior to the deactivated cylinder 103b in the combustion sequence has no or reduced backflow at the intake valve opening. This deactivation condition fuelling amount and timing also results in the just prior active cylinder 103a in the combustion sequence having a lower cylinder pressure at the intake valve opening, no or reduced back flow at the intake valve opening, and a higher air-to-fuel ratio. In addition, the deactivation condition fuelling amount and timing for the deactivated cylinder(s) 103b is configured so the next cylinder in the combustion sequence (after the deactivated cylinder(s) 103b) has less back flow since the pressure drop in the intake manifold is reduced from nominal conditions. The combustion recipe for the deactivated cylinder(s) 103b is thus designed to achieve an increased GIMEP along with a decrease in PMEP, such as seen in the conventional cylinder deactivation systems in which hardware is provided for intake and exhaust valve closing during the deactivation condition, by creating a deactivated cylinder 103b from a pressure balance standpoint without providing additional hardware or intake and exhaust valve opening and closing timing. The active cylinders 103a perform at a higher individual brake efficiency standpoint, ostensibly resulting in a net higher engine brake efficiency.

The disclosed systems, methods and apparatus provide low cost cylinder deactivation that, although will not perform quite as well as a cylinder deactivation system having both full air flow cutoff and fuel cutoff using the additional valve control hardware, benefits from no additional hardware costs. This may prove to be more robust and could be designed to adapt to the change in fuel system performance. Additional performance benefits may be realized through the use of in-cylinder pressure sensors, although the use of in-cylinder pressure sensors is not required.

Various aspects of the present disclosure are contemplated. According to one aspect, a system includes an internal combustion engine including a plurality of cylinders connected to an intake system and to an exhaust system. Each of the cylinders includes at least one intake valve and at least one exhaust valve. A valve actuation mechanism is connected to each of the plurality of cylinders. The valve actuation mechanism includes a lifting mechanism configured to lift and close the at least one intake valve of each of the plurality of cylinders during a nominal cycle of cylinder operation while the at least one exhaust valve of each of the plurality of cylinders is also lifted and closed with the lifting mechanism during the nominal cycle of cylinder operation. The system also includes a controller configured to interpret a cylinder deactivation condition in response to one or more operating conditions of the internal combustion engine, and in response to the cylinder deactivation condition, select one or more of the plurality of cylinders for deactivation and combust fuel in the one or more deactivated cylinders in a second amount and timed to reduce an air flow through the one or more deactivated cylinders from an air flow during the nominal cycle of cylinder operation and wherein the second fuel amount is less than first fuel amount.

In one embodiment, the controller is configured to continue to open and close the intake and exhaust valves of each of the plurality of cylinders the same as during the nominal cycle of cylinder operation during deactivation of the one or more cylinders. In another embodiment, the second fuel amount and the timing of the combustion of the second fuel amount in the one or more deactivated cylinders is controlled by the controller to provide an engine brake efficiency during cylinder deactivation that has an increased gross indicated mean effective pressure and a reduced pumping mean effective pressure as compared to the nominal cycle of cylinder operation. In yet another embodiment, the second fuel amount and the timing of the combustion of the second fuel amount in the one or more deactivated cylinders is controlled by the controller to develop a pressure in a combustion chamber in each respective one of the one or more deactivated cylinders that substantially reduces air flow through each respective one or more deactivated cylinders as compared to an air flow through each the plurality of cylinders during the nominal cycle of cylinder operation.

In another embodiment, during deactivation an engine brake efficiency increases from the nominal cycle of operation in response to the second amount of fuel provided to the one or more deactivated cylinders. In yet another embodiment, the controller is configured to fuel remaining ones of the plurality of cylinders during the cylinder deactivation condition in a third amount that more than the second amount. In still another embodiment, the controller is configured to interpret an output demand for the internal combustion engine and fuel remaining ones of the plurality of cylinders during the cylinder deactivation condition in a third amount that satisfies the output demand.

According to another aspect, an apparatus includes an electronic controller operably connected to an engine system, The electronic controller is configured to interpret a cylinder deactivation condition for a plurality of cylinders of the engine system in response to one or more operating conditions of the engine system during a nominal cycle of cylinder operation of the plurality of cylinders. In response to the cylinder deactivation condition, electronic controller is configured to select one or more of the plurality of cylinders for deactivation and provide a fuelling command to combust fuel in the one or more deactivated cylinders in an amount timed to reduce an air flow through the one or more deactivated cylinders from the nominal cycle of cylinder operation with intake and exhaust valve opening and closing of all the plurality of cylinders continuing as during the nominal cycle of cylinder operation.

In one embodiment, the combusted fuel amount in the one or more deactivated cylinders during cylinder deactivation is substantially less than during the nominal cycle of cylinder operation. In another embodiment, the electronic controller is configured to control the amount and the timing of the combustion of the fuel in the one or more deactivated cylinders with the fuelling command to provide an engine brake efficiency during cylinder deactivation that has an increased gross indicated mean effective pressure and a reduced pumping mean effective pressure as compared to the nominal cycle of cylinder operation. In still another embodiment, the electronic controller is configured to control the amount and the timing of the combustion of the fuel in the one or more deactivated cylinders with the fuelling command to develop a pressure in a combustion chamber of each respective one of the one or more deactivated cylinders that substantially reduces air flow through the respective one or more deactivated cylinders as compared to an air flow through the plurality of cylinders during the nominal cycle of cylinder operation.

In another embodiment, during deactivation of the one or more cylinders, engine brake efficiency increases from the nominal cycle of cylinder operation in response to the amount of fuel provided to the one or more deactivated cylinders in response to the fuelling command. In yet another embodiment, the electronic controller is configured to provide a second fuelling command to fuel remaining ones of the plurality of cylinders during the cylinder deactivation condition in a second amount that greater than the amount combusted in the one or more deactivated cylinders. In still another embodiment, the electronic controller is configured to interpret an output demand for the internal combustion engine and provide a second fuelling command fuel remaining ones of the plurality of cylinders in a second amount that satisfies the output demand.

In still another aspect of the present disclosure, a method includes: operating a plurality of cylinders of an internal combustion engine with a nominal valve lift profile and a nominal fuelling amount; determining a cylinder deactivation condition in response to one or more engine operating conditions; and in response to the cylinder deactivation condition, operating a portion of the plurality of cylinders by providing a deactivation fuelling amount to the deactivated portion of the plurality of cylinders. The deactivated fuelling amount is combusted to effectively reduce an air flow through the deactivated portion of the plurality of cylinders from an air flow amount that occurs with operations based on the nominal valve lift profile and the nominal fuelling amount, and the deactivation fuelling amount is less than the nominal fuelling amount.

In one embodiment, the method includes continuing to open and close the intake and exhaust valves of each of the plurality of cylinders according to the nominal lift profile during the cylinder deactivation condition. In another embodiment, the method includes increasing engine brake efficiency during the cylinder deactivation condition from an engine brake efficiency occurring during operations with the nominal valve lift profile and the nominal fuelling amount. In yet another embodiment, the method includes fuelling a remaining portion of the plurality of cylinders during the cylinder deactivation condition in an amount that exceeds the nominal fuelling amount.

In another embodiment, the method includes, during the cylinder deactivation condition, increasing a gross indicated mean effective pressure of an engine brake efficiency and reducing a pumping mean effective pressure of the engine brake efficiency as compared to operations with the nominal valve lift profile and nominal fuelling amount. In yet another embodiment, the method includes combusting the deactivation fuelling amount increases gross indicated mean effective pressure and decreases pumping mean effective pressure without altering intake and exhaust valve opening and closing timing of the deactivated portion of the plurality of cylinders.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
an internal combustion engine including a plurality of cylinders connected to an intake system and to an exhaust system, each of the cylinders including at least one intake valve and at least one exhaust valve;
a valve actuation mechanism connected to each of the plurality of cylinders, the valve actuation mechanism including a lifting mechanism configured to lift and close the at least one intake valve of each of the plurality of cylinders during a nominal cycle of cylinder operation while the at least one exhaust valve of each of the plurality of cylinders is also lifted and closed with the lifting mechanism during the nominal cycle of cylinder operation, wherein each of the plurality of cylinders is fuelled with a first fuel amount during the nominal cycle of cylinder operation; and
a controller configured to interpret a cylinder deactivation condition in response to one or more operating conditions of the internal combustion engine, and in response to the cylinder deactivation condition, select one or more of the plurality of cylinders for deactivation and combust fuel in the one or more deactivated cylinders in a second amount timed during an opening of the at least one intake valve with an opening of the at least one exhaust valve of the one or more deactivated cylinders to reduce an air flow through the one or more deactivated cylinders from an air flow during the nominal cycle of cylinder operation and wherein the second fuel amount is less than first fuel amount, wherein the controller is configured to continue to open and close the intake and exhaust valves of each of the plurality of cylinders the same as during the nominal cycle of cylinder operation during deactivation of the one or more cylinders.

2. The system of claim 1, wherein the second fuel amount and the timing of the combustion of the second fuel amount in the one or more deactivated cylinders is controlled by the controller to provide an engine brake efficiency during cylinder deactivation that has an increased gross indicated mean effective pressure and a reduced pumping mean effective pressure as compared to the nominal cycle of cylinder operation.

3. The system of claim 1, wherein the second fuel amount and the timing of the combustion of the second fuel amount in the one or more deactivated cylinders is controlled by the controller to develop a pressure in a combustion chamber in each respective one of the one or more deactivated cylinders that substantially reduces air flow through each respective one or more deactivated cylinders as compared to an air flow through each the plurality of cylinders during the nominal cycle of cylinder operation.

4. The system of claim 1, wherein during deactivation an engine brake efficiency increases from the nominal cycle of operation in response to the second amount of fuel provided to the one or more deactivated cylinders.

5. The system of claim 1, wherein the controller is configured to fuel remaining ones of the plurality of cylinders during the cylinder deactivation condition in a third amount that more than the second amount.

6. The system of claim 1, wherein the controller is configured to interpret an output demand for the internal combustion engine and fuel remaining ones of the plurality of cylinders during the cylinder deactivation condition in a third amount that satisfies the output demand.

7. An apparatus, comprising:
an electronic controller operably connected to an engine system, wherein the electronic controller is configured to interpret a cylinder deactivation condition for a plurality of cylinders of the engine system in response to one or more operating conditions of the engine system during a nominal cycle of cylinder operation of the plurality of cylinders, and in response to the cylinder deactivation condition, select one or more of the plurality of cylinders for deactivation and providing a fuelling command to combust fuel in the one or more deactivated cylinders in an amount timed during an opening of the at least one intake valve with an opening of the at least one exhaust valve of the one or more deactivated cylinders to reduce an air flow through the one or more deactivated cylinders from the nominal cycle of cylinder operation with intake and exhaust valve opening and closing of all the plurality of cylinders continuing as during the nominal cycle of cylinder operation, wherein the controller is configured to continue to the intake and exhaust valves opening and closing of each of the plurality of cylinders the same as during the nominal cycle of cylinder operation during deactivation of the one or more cylinders.

8. The apparatus of claim 7, wherein the combusted fuel amount in the one or more deactivated cylinders during cylinder deactivation is substantially less than during the nominal cycle of cylinder operation.

9. The apparatus of claim 7, wherein the electronic controller is configured to control the amount and the timing of the combustion of the fuel in the one or more deactivated cylinders with the fuelling command to provide an engine brake efficiency during, cylinder deactivation that has an increased gross indicated mean effective pressure and a reduced pumping mean effective pressure as compared to the nominal cycle of cylinder operation.

10. The apparatus of claim 7, wherein the electronic controller is configured to control the amount, and the timing of the combustion of the fuel in the one or more deactivated cylinders with the fuelling command to develop a pressure in a combustion chamber of each respective one of the one or more deactivated cylinders that substantially reduces air flow through the respective one or more deactivated cylinders as compared to an air flow through the plurality of cylinders during the nominal cycle of cylinder operation.

11. The apparatus of claim 7, wherein during deactivation of the one or more cylinders engine brake efficiency increases from the nominal cycle of cylinder operation in response to the amount of fuel provided to the one or more deactivated cylinders in response to the fuelling command.

12. The apparatus of claim 7, wherein the electronic controller is configured to provide a second fuelling command to fuel remaining ones of the plurality of cylinders during the cylinder deactivation condition in a second amount that greater than the amount combusted the one or more deactivated cylinders.

13. The apparatus of claim 7, wherein the electronic controller is configured to interpret an output demand for the internal combustion engine and provide a second fuelling command fuel remaining ones of the plurality of cylinders in a second amount that satisfies the output demand.

14. A method, comprising:
operating a plurality of cylinders of an internal combustion engine with a nominal valve lift profile and a nominal fuelling amount;
determining a cylinder deactivation condition in response to one or more engine operating conditions; and
in response to the cylinder deactivation condition, operating a portion of the plurality of cylinders by providing a deactivation fuelling amount to the deactivated portion of the plurality of cylinders, wherein the deactivated fuelling amount is combusted during an opening of the at least one intake valve with an opening of the at least one exhaust valve of the one or more deactivated cylinders to effectively reduce an air flow through the deactivated portion of the plurality of cylinders from an air flow amount that occurs with operations based on the nominal valve lift profile and the nominal fuelling amount, wherein the deactivation fuelling amount is less than the nominal fuelling amount while continuing to open and close the intake and exhaust valves of each of the plurality of cylinders according to the nominal lift profile during the cylinder deactivation condition.

15. The method of claim 14, further comprising increasing engine brake efficiency during the cylinder deactivation condition from an engine brake efficiency occurring during operations with the nominal valve lift profile and the nominal fuelling amount.

16. The method of claim 14, further comprising fuelling a remaining portion of the plurality of cylinders during the cylinder deactivation condition in an amount that exceeds the nominal fuelling amount.

17. The method of claim 14, further comprising, during the cylinder deactivation condition, increasing a gross indicated mean effective pressure of an engine brake efficiency and reducing a pumping mean effective pressure of the engine brake efficiency as compared to operations with the nominal valve lift profile and nominal fuelling amount.

18. The method of claim 14, wherein combusting the deactivation fuelling amount increases gross indicated mean effective pressure and decreases pumping mean effective pressure without altering intake and exhaust valve opening and closing timing of the deactivated portion of the plurality of cylinders.

* * * * *